(12) United States Patent
Jahshan et al.

(10) Patent No.: US 11,731,717 B2
(45) Date of Patent: Aug. 22, 2023

(54) SPACER TOOL

(71) Applicant: Caterpillar Inc., Peoria, IL (US)

(72) Inventors: Rany Jahshan, Aurora, IL (US); Jesus Carlos Vallejo Lopez, Garcia (MX); Amory Rodriguez Diccion, Oswego, IL (US)

(73) Assignee: Caterpillar Inc., Peoria, IL (US)

( * ) Notice: Subject to any disclaimer, the term of this patent is extended or adjusted under 35 U.S.C. 154(b) by 644 days.

(21) Appl. No.: 16/801,522

(22) Filed: Feb. 26, 2020

(65) Prior Publication Data
US 2021/0261209 A1    Aug. 26, 2021

(51) Int. Cl.
| | |
|---|---|
| *G01B 3/26* | (2006.01) |
| *G01B 3/30* | (2006.01) |
| *G01B 5/14* | (2006.01) |
| *B62D 65/06* | (2006.01) |
| *B60J 1/00* | (2006.01) |
| *E06B 3/56* | (2006.01) |
| *B62D 65/02* | (2006.01) |
| *E04F 21/00* | (2006.01) |

(52) U.S. Cl.
CPC ............. *B62D 65/06* (2013.01); *B60J 1/005* (2013.01); *B62D 65/026* (2013.01); *E04F 21/0007* (2013.01); *E06B 3/56* (2013.01); *G01B 3/26* (2013.01); *G01B 3/30* (2013.01); *G01B 5/14* (2013.01)

(58) Field of Classification Search
CPC ........ B62D 65/06; B62D 65/026; B60J 1/005; E04F 21/0007; E06B 3/56; G01B 3/26; G01B 3/30; G01B 5/14; B25B 11/00; F16B 11/006
See application file for complete search history.

(56) References Cited

U.S. PATENT DOCUMENTS

| | | | | |
|---|---|---|---|---|
| 2,229,124 A | * | 1/1941 | Phillips | ............... G01B 3/00 |
| | | | | 33/542 |
| 2,664,638 A | * | 1/1954 | Storey | ................ G01B 3/30 |
| | | | | 33/562 |
| 3,426,436 A | * | 2/1969 | Perwas | .............. G01B 3/303 |
| | | | | 33/567 |

(Continued)

FOREIGN PATENT DOCUMENTS

| | | |
|---|---|---|
| JP | 03118504 | 12/2000 |
| JP | 03355701 | 12/2002 |

(Continued)

*Primary Examiner* — Yaritza Guadalupe-McCall
(74) *Attorney, Agent, or Firm* — Bookoff McAndrews, PLLC

(57) ABSTRACT

A spacer tool for assembling a glass panel on a frame is provided. The spacer tool includes a body defining a central axis and a width along the central axis. The spacer tool includes a bore disposed within the body and axially aligned along the central axis. The bore is adapted to receive an alignment pin disposed on the frame. The spacer tool also includes a plurality of lands disposed on the body. Each of the plurality of lands is disposed substantially parallel to and spaced apart from the central axis, each of the plurality of lands is adapted to selectively contact an edge of the glass panel. Each of the plurality of lands is disposed at a distance relative to the central axis different from one another.

20 Claims, 6 Drawing Sheets

(56) References Cited

U.S. PATENT DOCUMENTS

| | | | | |
|---|---|---|---|---|
| 3,908,278 | A * | 9/1975 | Sundahl | G01B 3/30 33/502 |
| 5,329,703 | A * | 7/1994 | Craig | G01B 5/242 33/502 |
| 6,813,842 | B2 * | 11/2004 | Wang | G01B 3/30 33/534 |
| 9,021,764 | B2 | 5/2015 | Yoon | |
| 9,481,980 | B2 | 11/2016 | Bang | |
| 9,683,826 | B2 * | 6/2017 | Cupertino | G01B 3/30 |
| 11,293,742 | B2 * | 4/2022 | Anderson | G01B 5/14 |
| 2015/0168120 | A1 * | 6/2015 | Cupertino | E04F 21/0007 33/194 |
| 2021/0207937 | A1 * | 7/2021 | Cain | G01B 3/50 |
| 2021/0261209 | A1 * | 8/2021 | Jahshan | E06B 3/56 |
| 2021/0318110 | A1 * | 10/2021 | Anderson | G01B 5/14 |

FOREIGN PATENT DOCUMENTS

| | | |
|---|---|---|
| JP | 04685275 | 5/2011 |
| JP | 05379730 | 12/2013 |

\* cited by examiner

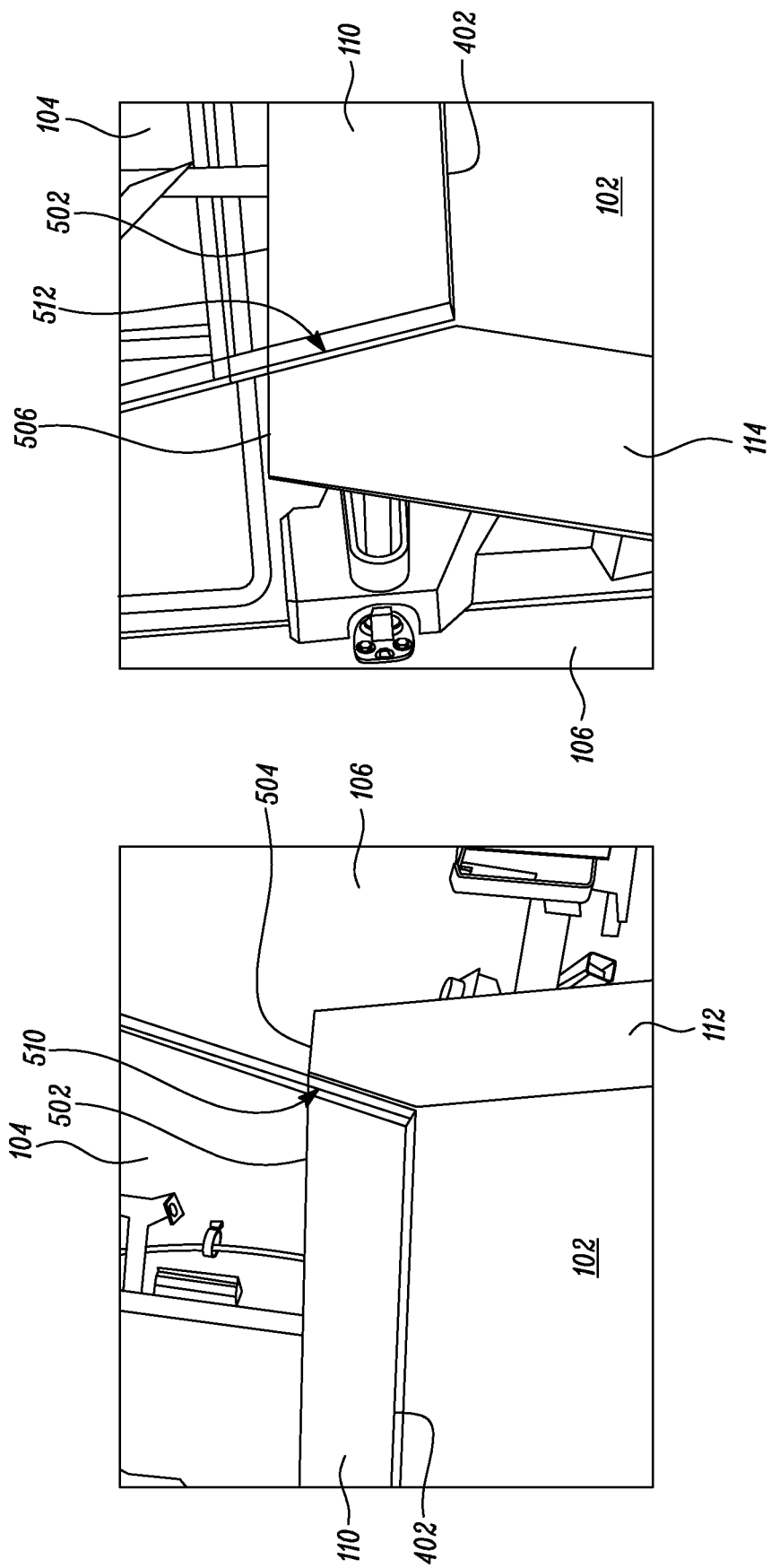

SPACER TOOL

TECHNICAL FIELD

The present disclosure relates to a spacer tool. More particularly, the present disclosure relates to the spacer tool for assembling a glass panel on a frame.

BACKGROUND

An operator cabin on a vehicle, such as a construction vehicle, may include a number of glass panels. The glass panels may form the windshield and/or rear windows of the operator cabin. During assembly, each of the glass panels may have to be aligned relative to the frame and one another, in order, to provide a desired fit and finish of the glass panels on the operator cabin. Additionally, one or more of the glass panels may include a fritting portion. The fritting portion of each of the glass panels may also have to be aligned relative to one another in order to provide a desired aesthetic quality.

In many situations, each of the glass panels may be aligned manually by an assembly operator. As such, the assembly process may require increased operator skill, increased labor effort, increased process duration, and in some cases, may result in an incorrect alignment of the glass panels. In some situations, multiple spacer elements may be used in order to provide the desired fit and finish of the glass panels on the operator cabin. However, adjustment of such spacer elements may, in turn, require increased operator skill, increased labor effort, increased process duration, and in some cases, may result in an incorrect alignment of the glass panels. Hence, there is a need for an improved spacer tool for such applications.

U.S. Pat. No. 9,481,980 describes an apparatus to detachably fix a lower glass of a cab according to a working environment through simple adjustment of an adjustment knob. The apparatus includes a lower bracket fixedly installed on a lower side of a window frame of the cab. The apparatus includes a rubber member to prevent a secession of the lower glass. The apparatus includes a knob support plate. The knob support plate includes a fixing plate having a guide groove and a position setting hole. The apparatus also includes a support plate having a compression pad. The fixing plate is fixedly installed on an upper side of the window frame and the support plate compressively supports one side of an upper portion of the lower glass. The apparatus further includes an adjustment knob having a projection portion. The projection portion is fitted into the guide groove to be slidably guided clockwise or counterclockwise.

SUMMARY OF THE DISCLOSURE

In an aspect of the present disclosure, a spacer tool for assembling a glass panel on a frame is provided. The spacer tool includes a body defining a central axis and a width along the central axis. The spacer tool includes a bore disposed within the body and axially aligned along the central axis. The bore is adapted to receive an alignment pin disposed on the frame. The spacer tool also includes a plurality of lands disposed on the body. Each of the plurality of lands is disposed substantially parallel to and spaced apart from the central axis, each of the plurality of lands is adapted to selectively contact an edge of the glass panel. Each of the plurality of lands is disposed at a distance relative to the central axis different from one another.

In another aspect of the present disclosure, a method for assembling a glass panel on a frame using a spacer tool is provided. The method includes rotatably providing the spacer tool on an alignment pin disposed on the frame. The method includes providing the glass panel on the frame adjacent to the spacer tool. The method also includes contacting an edge of the glass panel with a first land of a plurality of lands disposed on the spacer tool. The first land disposed at a first distance from a central axis of the spacer tool. The method further includes aligning a fritting portion on the glass panel with another fritting portion of an adjacent glass panel.

Other features and aspects of this disclosure will be apparent from the following description and the accompanying drawings.

BRIEF DESCRIPTION OF THE DRAWINGS

FIGS. 5A and 5B are different perspective views of the operator cabin showing glass panels assembled thereon, according to one embodiment of the present disclosure.

DETAILED DESCRIPTION

Figure 1:
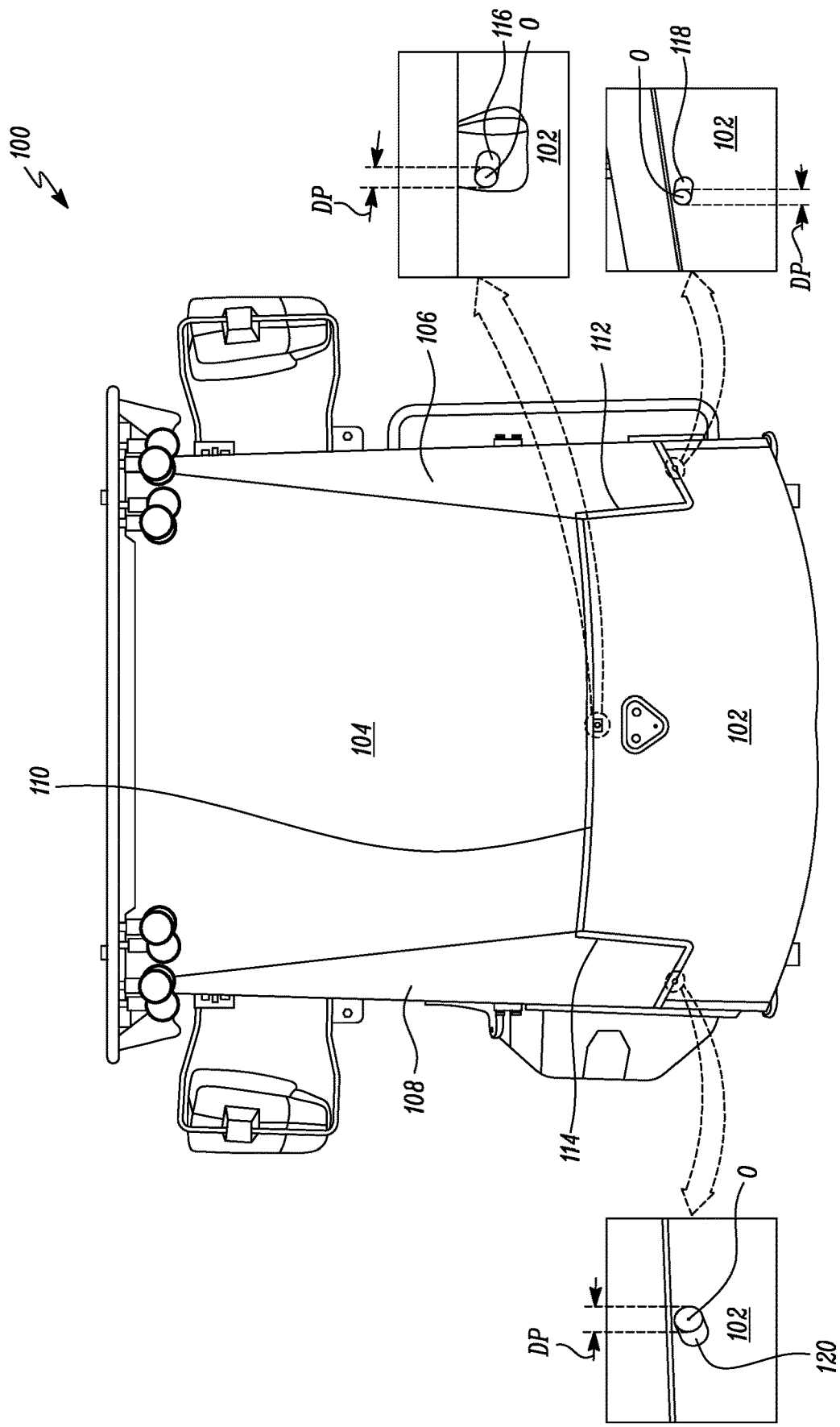
FIG. 1 is a front view of an exemplary operator cabin associated with a machine, according to one embodiment of the present disclosure.
Figure 2A:
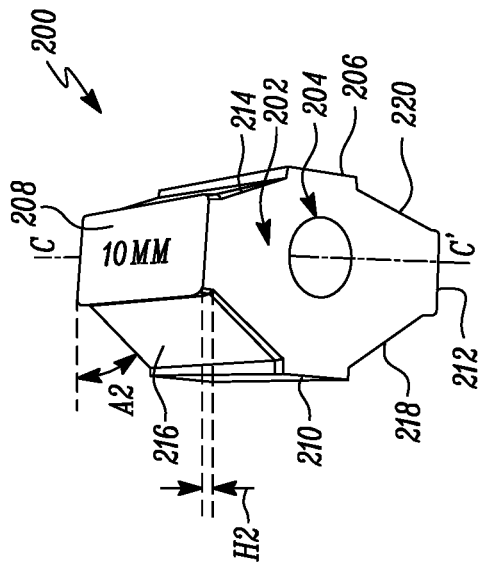
FIGS. 2A, 2B, 2C, and 2D are different perspective views of a spacer tool, according to one embodiment of the present disclosure.
Figure 2B:
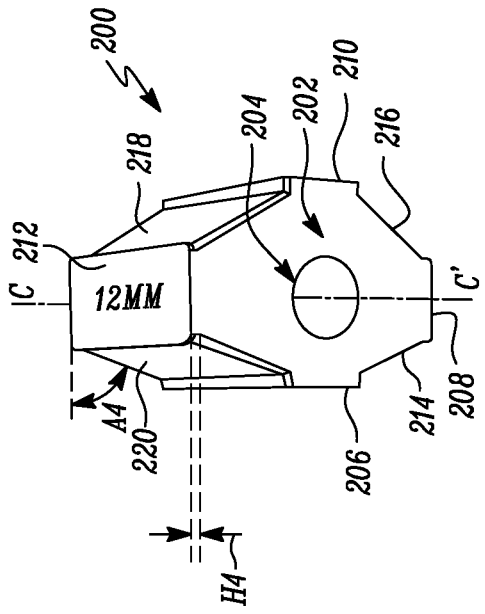
Figure 2C:
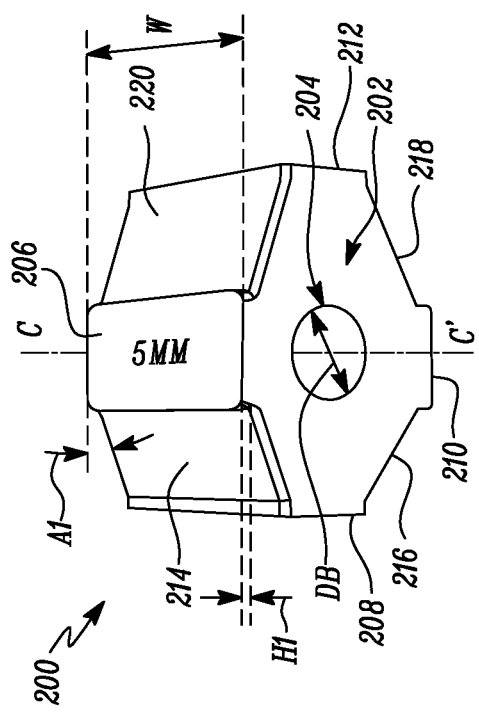
Figure 2D:
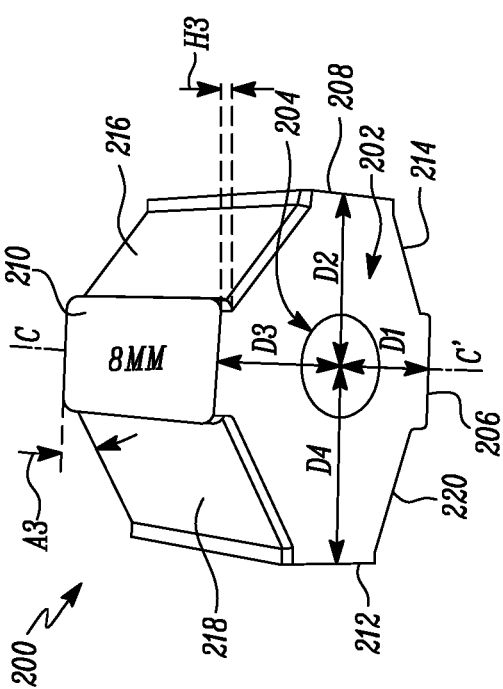

Wherever possible, the same reference numbers will be used throughout the drawings to refer to the same or like parts. Referring to FIG. 1, a front view of an exemplary operator cabin 100 is illustrated. The operator cabin 100 will be hereinafter interchangeably referred to as the "cab 100". The cab 100 may be associated with any machine including, but not limited to, a construction vehicle such as an excavator, a wheel loader, a backhoe loader, a motor grader, a paver, a compactor, a crane, and so on; a passenger vehicle such as a car, a Sports Utility Vehicle (SUV), a pickup truck; a commercial or transport vehicle such as a truck, a van, and so on, a locomotive, a watercraft, and an aircraft. The cab 100 may be associated with any machine associated with any industry including, but not limited to, construction, transport, mining, material handling, waste management, marine, and aviation.

The cab 100 includes a frame 102. In one embodiment, the frame 102 may be a single unit structure. In other embodiments, the frame 102 may have a multi-unit structure. The frame 102 is adapted to support one or more components (not shown) of the cab 100, such as one or more doors, window panels, windshield panels, seats, operator interfaces, operator consoles, dashboard, electrical/electronic equipment, mirrors, floor panels, internal lights, external lights, and so on. The cab 100 also includes a number of glass panels, such as a first glass panel 104, a second glass panel 106, and a third glass panel 108. The first glass panel 104 will be hereinafter interchangeably referred to as the "first glass 104". The second glass panel 106 will be hereinafter interchangeably referred to as the "second glass 106". The third glass panel 108 will be hereinafter interchangeably referred to as the "third glass 108".

In the illustrated embodiment, the cab 100 includes three glass panels. In other embodiments, the cab 100 may include single or multiple glass panels, based on application requirements. In the illustrated embodiment, each of the first glass 104, the second glass 106, and the third glass 108 refer to the windshield panel of the cab 100. In other embodiments, one or more of the first glass 104, the second glass 106, and the third glass 108 may refer to the window panel of the cab 100. Each of the first glass 104, the second glass 106, and the third glass 108 may be made of any type of automotive glass, such as tempered glass, toughened glass, laminated glass, and so on, based on application requirements.

Each of the first glass 104, the second glass 106, and the third glass 108 also includes a fritting portion 110, 112, 114, respectively. The fritting portion 110, 112, 114 is adapted to limit visibility of a portion of the frame 102 and/or an adhesive layer (not shown) disposed between the frame 102 and each of the first glass 104, the second glass 106, and the third glass 108, respectively. Additionally, the fritting portion 110, 112, 114 is adapted to limit exposure of the adhesive layer to light rays, such as ultraviolet (UV) rays, in order to limit deterioration of the adhesive layer. Each of the first glass 104, the second glass 106, and the third glass 108 is adapted to limit entry of foreign material, such as dust, debris, suspended/flying objects, rain, snow, and so on into the cab 100. Also, each of the first glass 104, the second glass 106, and the third glass 108 is adapted to provide visibility of external environment to an operator (not shown) from within the cab 100.

The cab 100 also includes a number of alignment pins, such as a first alignment pin 116, a second alignment pin 118, and a third alignment pin 120. The first alignment pin 116 will be hereinafter interchangeably referred to as the "first pin 116". The second alignment pin 118 will be hereinafter interchangeably referred to as the "second pin 118". The third alignment pin 120 will be hereinafter interchangeably referred to as the "third pin 120". Each of the first pin 116, the second pin 118, and the third pin 120 defines a diameter "DP". Each of the first pin 116, the second pin 118, and the third pin 120 is disposed on the frame 102, and in association with each of the first glass 104, the second glass 106, and the third glass 108. In the illustrated embodiment, the alignment pins include one alignment pin disposed in association with each of the first glass 104, the second glass 106, and the third glass 108. In other embodiments, the alignment pins may include multiple alignment pins disposed in association with each of the first glass 104, the second glass 106, and the third glass 108.

The present disclosure relates to a spacer tool 200 for assembling each of the first glass 104, the second glass 106, and the third glass 108 on the frame 102. Referring to FIGS. 2A, 2B, 2C, and 2D, different perspective views of the spacer tool 200 are illustrated. The spacer tool 200 will be hereinafter interchangeably referred to as the "tool 200". The tool 200 will now be explained with combined reference to FIGS. 2A to 2D. The tool 200 includes a body 202. In the illustrated embodiment, the body 202 has a substantially diamond-like shape. In other embodiments, the body 202 may have any other shape, such an elliptical shape, a triangular shape, a rectangular shape, and so on, based on application requirements. The body 202 defines a central axis C-C' and a width "W" along the central axis C-C'.

The tool 200 also includes a bore 204. The bore 204 defines a diameter "DB". The bore 204 is disposed within the body 202 and axially aligned along the central axis C-C'. In the illustrated embodiment, the bore 204 is a through hole, such that the bore 204 extends substantially along the width "W" of the body 202. In other embodiments, the bore 204 may be a closed hole, such that the bore 204 may extend partly along the width "W" of the body 202. The bore 204 is adapted to receive any one of the first pin 116, the second pin 118, and the third pin 120 disposed on the frame 102, and will be explained in more detail later. Accordingly, the diameter "DB" of the bore 204 is approximately equal to the diameter "DP" of each of the first pin 116, the second pin 118, and the third pin 120.

The tool 200 further includes a plurality of lands, such as a first land 206, a second land 208, a third land 210, and a fourth land 212. In the illustrated embodiment, the plurality of lands includes four lands. In other embodiments, the plurality of lands may include any number of lands, based on application requirements. Each of the plurality of lands is disposed on the body 202 and substantially parallel to and spaced apart from the central axis C-C'. More specifically, each of the first land 206, the second land 208, the third land 210, and the fourth land 212 is disposed on the first body 202, such that each of the first land 206, the second land 208, the third land 210, and the fourth land 212 is substantially parallel to the central axis C-C'. Also, each of the first land 206, the second land 208, the third land 210, and the fourth land 212 is spaced apart from the central axis C-C'.

Each of the plurality of lands is disposed at a distance relative to the central axis C-C' different from one another. More specifically, the first land 206 is disposed at a first distance "D1" relative to the central axis C-C'. The second land 208 is disposed at a second distance "D2" relative to the central axis C-C'. The second distance "D2" is different from the first distance "D1". The third land 210 is disposed at a third distance "D3" relative to the central axis C-C'. The third distance "D3" is different from each of the first distance "D1" and the second distance "D2". The fourth land 212 is disposed at a fourth distance "D4" relative to the central axis C-C'. The fourth distance "D4" is different from each of the first distance "D1", the second distance "D2", and the third distance "D3".

In the illustrated embodiment, the first distance "D1" measures approximately 5 millimeters (mm), the second distance "D2" measures approximately 10 mm, the third distance "D3" measures approximately 8 mm, and the fourth distance "D4" measures approximately 12 mm. In other embodiments, an actual value of each of the first distance "D1", the second distance "D2", the third distance "D3", and the fourth distance "D4" may vary, based on application requirements. Each of the first land 206, the second land 208, the third land 210, and the fourth land 212 is adapted to selectively contact an edge of the glass panel, such as the first glass 104, the second glass 106, and the third glass 108, and will be explained in more detail later.

In the illustrated embodiment, each of the plurality of lands is substantially perpendicular to one another. More specifically, each of the first land 206, the second land 208, the third land 210, and the fourth land 212 is substantially perpendicular to one another. Also, in the illustrated embodiment, opposing lands of the plurality of lands are substantially parallel to one another. More specifically, each of the first land 206 and the third land 210 is substantially parallel to one another. Also, each of the second land 208 and the fourth land 212 is substantially parallel to one another. In other embodiments, one or more of the first land 206, the second land 208, the third land 210, and the fourth land 212 may be inclined at any other angle relative to one another.

Further, in the illustrated embodiment, each of the plurality of lands, such as each of the first land 206, the second land 208, the third land 210, and the fourth land 212 has a substantially rectangular configuration. In other embodiments, one or more of the first land 206, the second land 208, the third land 210, and the fourth land 212 may have any other configuration, such as a triangular configuration, a trapezoidal configuration, a circular configuration, an elliptical configuration, and so on, based on application requirements.

The tool 200 also includes a plurality of connecting surfaces, such as a first connecting surface 214, a second connecting surface 216, a third connecting surface 218, and a fourth connecting surface 220. Each of the plurality of connecting surfaces is disposed between adjacent lands of the plurality of lands. More specifically, the first connecting surface 214 is disposed between the first land 206 and the second land 208. The second connecting surface 216 is disposed between the second land 208 and the third land 210. The third connecting surface 218 is disposed between the third land 210 and the fourth land 212. The fourth connecting surface 220 is disposed between the fourth land 212 and the first land 206.

In the illustrated embodiment, each of the first connecting surface 214, the second connecting surface 216, the third connecting surface 218, and the fourth connecting surface 220 has a substantially flat configuration. Accordingly, each of the plurality of connecting surfaces defines an angle relative to an adjacent land of the plurality of lands. More specifically, the first connecting surface 214 defines an angle "A1" relative to the first land 206. The second connecting surface 216 defines an angle "A2" relative to the second land 208. The third connecting surface 218 defines an angle "A3" relative to the third land 210. The fourth connecting surface 220 defines an angle "A4" relative to the fourth land 212.

The angle of each of the plurality of connecting surfaces is different from one another. More specifically, the angle "A1" is different from each of the angle "A2", the angle "A3", and angle "A4". Also, the angle "A2" is different from each of the angle "A3" and the angle "A4". Further, the angle "A3" is different from the angle "A4". In other embodiments, one or more of the first connecting surface 214, the second connecting surface 216, the third connecting surface 218, and the fourth connecting surface 220 may have any other configuration, such an angled configuration, a curved configuration, and so on, based on application requirements.

In the illustrated embodiment, each of the plurality of lands is raised relative to adjacent connecting surfaces of the plurality of connecting surfaces. More specifically, the first land 206 is raised by a height "H1" relative to each of the first connecting surface 214 and the fourth connecting surface 220. In other embodiments, the first land 206 may be flush relative to one or more of the first connecting surface 214 and the fourth connecting surface 220, such that the height "H1" may be approximately zero units. The second land 208 is raised by a height "H2" relative to each of the first connecting surface 214 and the second connecting surface 216. In other embodiments, the second land 208 may be flush relative to one or more of the first connecting surface 214 and the second connecting surface 216, such that the height "H2" may be approximately zero units.

Also, the third land 210 is raised by a height "H3" relative to each of the second connecting surface 216 and the third connecting surface 218. In other embodiments, the third land 210 may be flush relative to one or more of the second connecting surface 216 and the third connecting surface 218, such that the height "H3" may be approximately zero units. Further, the fourth land 212 is raised by a height "H4" relative to each of the third connecting surface 218 and the fourth connecting surface 220. In other embodiments, the fourth land 212 may be flush relative to one or more of the third connecting surface 218 and the fourth connecting surface 220, such that the height "H4" may be approximately zero units. In the illustrated embodiment, each of the height "H1", the height "H2", the height "H3", and the height "H4" is approximately equal to one another, In other embodiments, one or more of the height "H1", the height "H2", the height "H3", and the height "H4" may be different from one another.

Figure 3:
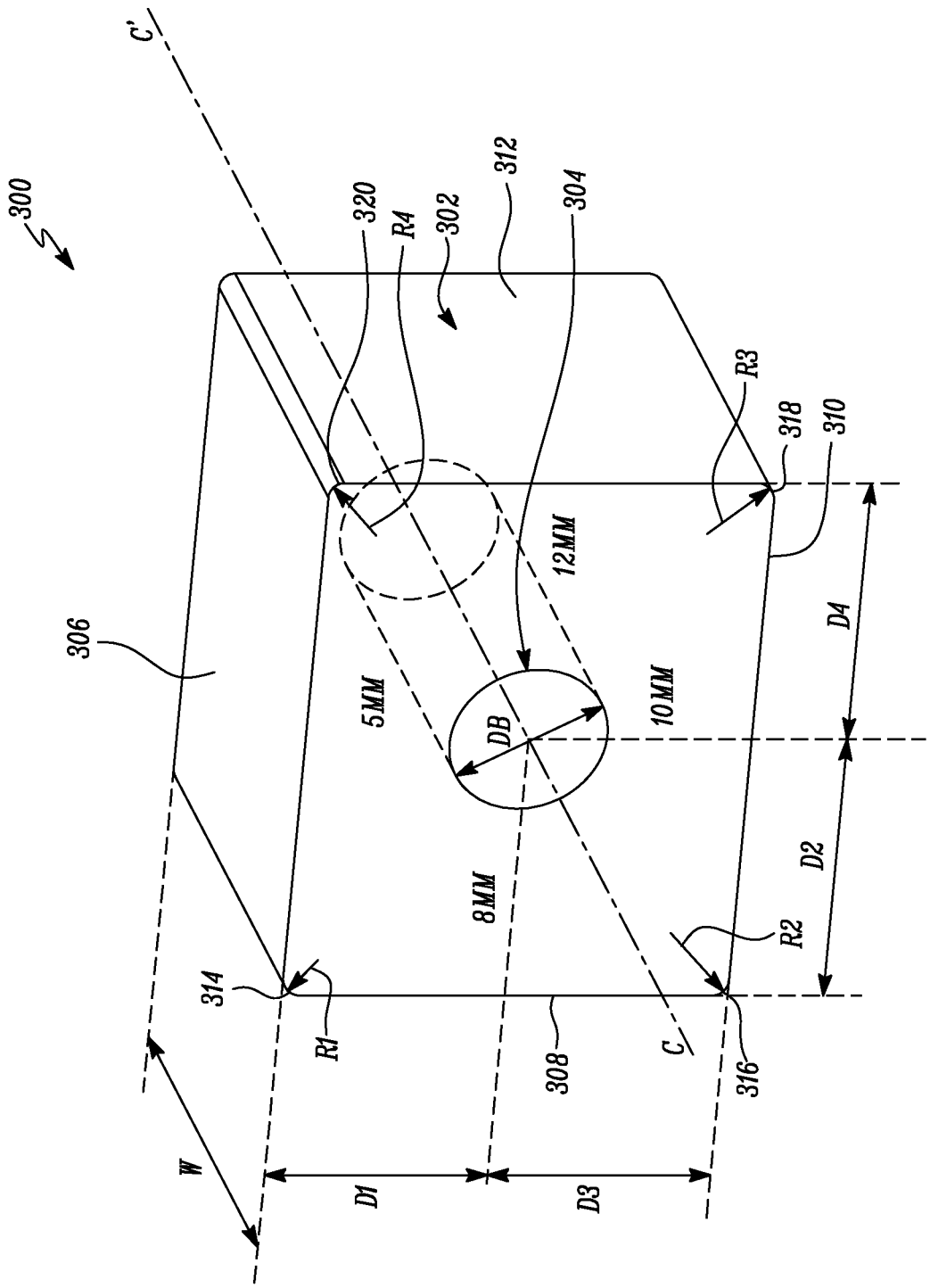
FIG. 3 is a perspective view of another spacer tool, according to another embodiment of the present disclosure.

Referring to FIG. 3, a perspective view of another spacer tool 300 is illustrated. The spacer tool 300 will be hereinafter interchangeably referred to as the "tool 300". In the illustrated embodiment, the tool 300 has a substantially rectangular shape. Also, the tool 300 has a configuration substantially similar to that of the tool 200. More specifically, the tool 300 includes a body 302 defining the central axis C-C' and a bore 304 disposed within the body 202 axially aligned along the central axis C-C'.

The tool 300 also includes a plurality of lands, such as a first land 306, a second land 308, a third land 310, and a fourth land 312. The first land 306 is disposed at the first distance "D1" relative to the central axis C-C'. The second land 308 is disposed at the second distance "D2" relative to the central axis C-C'. The third land 310 is disposed at the third distance "D3" relative to the central axis C-C'. The fourth land 312 is disposed at the fourth distance "D4" relative to the central axis C-C'.

The tool 300 further includes a plurality of connecting surfaces, such as a first connecting surface 314, a second connecting surface 316, a third connecting surface 318, and a fourth connecting surface 320. In the illustrated embodiment, each of the first connecting surface 314, the second connecting surface 316, the third connecting surface 318, and the fourth connecting surface 320 has a substantially curved configuration. Accordingly, each of the plurality of connecting surfaces defines a radius of curvature. More specifically, the first connecting surface 314 defines a radius "R1". The second connecting surface 316 defines a radius "R2". The third connecting surface 318 defines a radius "R3". The fourth connecting surface 320 defines a radius "R4". In the illustrated embodiment, each of the radius "R1", the radius "R2", the radius "R3", and the radius "R4" is approximately equal to one another. In other embodiments, one or more of the radius "R1", the radius "R2", the radius "R3", and the radius "R4" may be different from one another.

The tool 200, 300 may be manufactured using any material, such as a metal, an alloy, rubber, any polymer such as nylon, and so on, based on application requirements. Also, the tool 200, 300 may be manufactured using any manufacturing process, such as molding, fabrication, casting, additive manufacturing such as three-dimensional (3D) printing, and so on, based on application requirements.

INDUSTRIAL APPLICABILITY

Figure 4B:
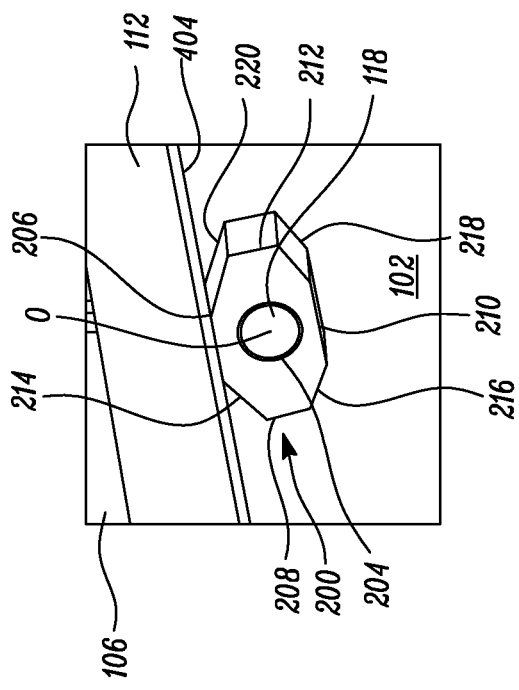
FIGS. 4A, 4B, and 4C are different perspective views of the operator cabin showing the spacer tool of FIG. 2A mounted thereon, according to one embodiment of the present disclosure.
Figure 4A:
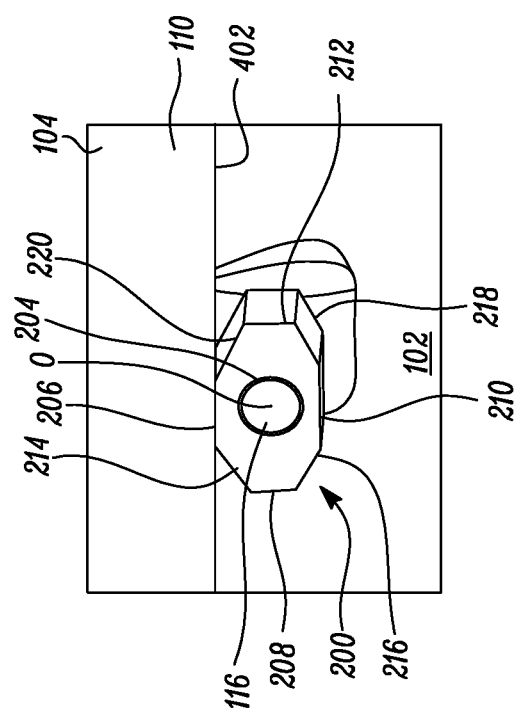
Figure 4C:
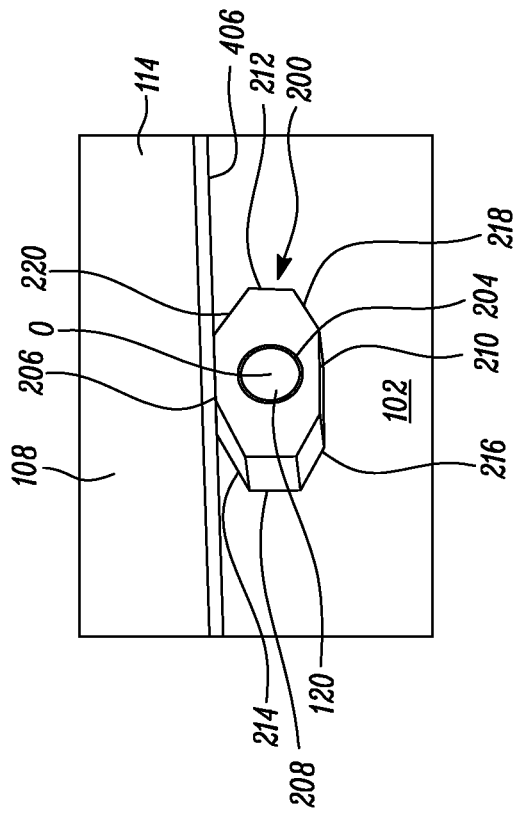
Figure 6:
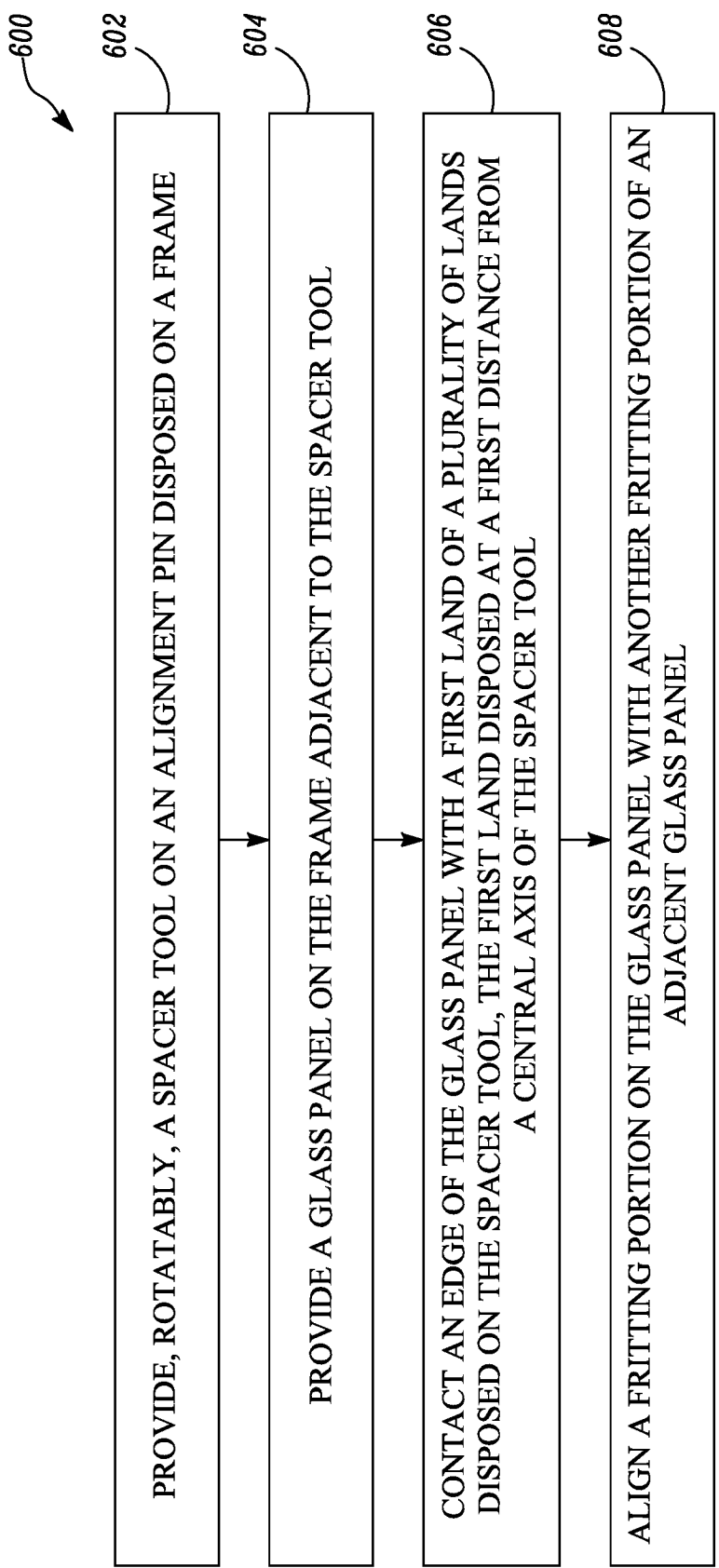
FIG. 6 is a flowchart illustrating a method for assembling the glass panel on the operator cabin, according to one embodiment of the present disclosure.

The present disclosure relates to a method 600 for assembling the glass panel, such as the first glass 104, the second glass 106, and the third glass 108 on the frame 102 of the cab 100 using the spacer tool 200. Referring to FIGS. 4A, 4B, and 4C, different views showing the tool 200 mounted on the first pin 116, the second pin 118 and the third pin 120, respectively, are illustrated. Referring to FIGS. 5A and 5B, different views showing the first glass 104, the second glass 106, and the third glass 108 assembled on the frame 102 are illustrated. Referring to FIG. 6, a flowchart of the method 600 is illustrated. The method 600 will now be explained with reference to the tool 200, and with combined reference to FIGS. 4A to 4C, 5A to 5B, and 6.

At step 602, and referring to FIG. 4A, the tool 200 is rotatably provided on the alignment pin disposed on the frame 102. More specifically, the first pin 116 is rotatably received in the bore 204 of the tool 200. At step 604, and still referring to FIG. 4A, the glass panel is provided on the frame 102 adjacent to the tool 200. More specifically, the first glass 104 is mounted on the frame 102 adjacent to the tool 200. Additionally, a primer layer and/or the adhesive layer may be provided between the frame 102 and an inner surface of the first glass 104, such as along the fritting portion 110, another fritting portion (not shown) provided on a top portion (not shown) of the first glass 104, and so on, based on application requirements.

At step 606, and still referring to FIG. 4A, an edge of the glass panel contacts with the first land 206 of the plurality of lands disposed on the tool 200. More specifically, in the illustrated embodiment, the first land 206 of the tool 200 contacts with a lower edge 402 of the first glass 104. As the first land 206 is disposed at the first distance "D1" from the central axis C-C' of the tool 200, the lower edge 402 of the first glass 104 is spaced at the first distance "D1", that is approximately 5 mm in this case, from a center "O" of the first pin 116. It should be noted that, in other embodiments, any of the second land 208, the third land 210, and/or the fourth land 212 may be contacted with the lower edge 402 of the first glass 104 based on a required spacing of the lower edge 402 of the first glass 104 relative to the center "O" of the first pin 116.

Further, referring to FIG. 4B, the tool 200 is rotatably provided on the second pin 118 disposed on the frame 102. The second glass 106 is then mounted on the frame 102 adjacent to the tool 200. The first land 206 of the tool 200 then contacts with a lower edge 404 of the second glass 106, such that the lower edge 404 of the second glass 106 is spaced at the first distance "D1", that is approximately 5 mm in this case, from a center "O" of the second pin 118. Additionally, a primer layer and/or the adhesive layer may be provided between the frame 102 and an inner surface of the second glass 106, such as along the fritting portion 112, another fitting portion (not shown) provided on a top portion (not shown) of the second glass 106, and so on, based on application requirements. It should be noted that, in other embodiments, any of the second land 208, the third land 210, and/or the fourth land 212 may be contacted with the lower edge 404 of the second glass 106 based on a required spacing of the lower edge 404 of the second glass 106 relative to the center "O" of the second pin 118.

In some situations, the tool 200 may be rotated about the alignment pin to contact the edge of the glass panel with any of the second land 208, the third land 210, and the fourth land 212 of the plurality of lands. More specifically, referring to FIG. 5A, in order to align a top edge 504 of the fritting portion 112 of the second glass 106 relative to a top edge 502 of the fritting portion 110 of the first glass 104, the tool 200 may be rotated about the second pin 118 to contact the lower edge 404 of the second glass 106 with any of the second land 208, the third land 210, and/or the fourth land 212 of the tool 200.

When the second land 208 contacts the lower edge 404 of the second glass 106, as the second land 208 is disposed at the second distance "D2" from the central axis C-C' of the tool 200, the lower edge 404 of the second glass 106 is spaced at the second distance "D2", that is approximately 10 mm in this case, from the center "O" of the second pin 118. When the third land 210 contacts the lower edge 404 of the second glass 106, as the third land 210 is disposed at the third distance "D3" from the central axis C-C' of the tool 200, the lower edge 404 of the second glass 106 is spaced at the third distance "D3", that is approximately 8 mm in this case, from the center "O" of the second pin 118.

When the fourth land 212 contacts the lower edge 404 of the second glass 106, as the fourth land 212 is disposed at the fourth distance "D4" from the central axis C-C' of the tool 200, the lower edge 404 of the second glass 106 is spaced at the fourth distance "D4", that is approximately 12 mm in this case, from the center "O" of the second pin 118. Accordingly, at step 608, and still referring to FIG. 5A, the fritting portion on the glass panel is aligned with another fritting portion of an adjacent glass panel. More specifically, the top edge 502 of the fritting portion 110 of the first glass 104 is aligned with the top edge 504 of the fritting portion 112 of the second glass 106.

Further, referring to FIG. 4C, the tool 200 is rotatably provided on the third pin 120 disposed on the frame 102. The third glass 108 is then mounted on the frame 102 adjacent to the tool 200. The first land 206 of the tool 200 then contacts with a lower edge 406 of the third glass 108, such that the lower edge 406 of the third glass 108 is spaced at the first distance "D1", that is approximately 5 mm in this case, from a center "O" of the third pin 120. Additionally, a primer layer and/or the adhesive layer may be provided between the frame 102 and an inner surface of the third glass 108, such as along the fritting portion 114, another fritting portion (not shown) provided on a top portion (not shown) of the third glass 108, and so on, based on application requirements. It should be noted that, in other embodiments, any of the second land 208, the third land 210, and/or the fourth land 212 may be contacted with the lower edge 406 of the third glass 108 based on a required spacing of the lower edge 406 of the third glass 108 relative to the center "O" of the third pin 120.

Further, referring to FIG. 5B, in order to align a top edge 506 of the fritting portion 114 of the third glass 108 relative to the top edge 502 of the fritting portion 110 of the first glass 104, the tool 200 may be rotated about the third pin 120 to contact the lower edge 406 of the third glass 108 with any of the second land 208, the third land 210, and/or the fourth land 212 of the tool 200. As such, the lower edge 406 of the third glass 108 may be spaced at the second distance "D2", the third distance "D3", or the fourth distance "D4" from the center "O" of the third pin 120 based on contact of the lower edge 406 of the third glass 108 with the second land 208, the third land 210, or the fourth land 212 of the tool 200, respectively. Accordingly, at step 608, and still referring to FIG. 5B, the top edge 502 of the fritting portion 110 of the first glass 104 is aligned with the top edge 506 of the fritting portion 114 of the third glass 108.

Further, the tool 200 is removed from each of the first pin 116, the second pin 118, and the third pin 120. It should be noted that in some embodiments, a single tool 200 may be sequentially mounted on each of the first pin 116, the second pin 118, and the third pin 120. In other embodiments, multiple tools 200 may be used such that each of the multiple tools 200 may be separately mounted on each of the first pin 116, the second pin 118, and the third pin 120.

Further, each of the first glass 104, the second glass 106, and the third glass 108 is bonded to the frame 102 by curing of the adhesive layer disposed between the frame 102 and the inner surface of each of the first glass 104, the second glass 106, and the third glass 108.

It should be noted that the method 600 described herein is merely exemplary and may vary, based on application requirements. For example, the method 600 may include one or more additional steps or may omit one or more steps described herein, based on process requirements. In some embodiments, additional preparation steps may be performed such as cleaning of mating surfaces between the frame 102 and each of the first glass 104, the second glass 106, and the third glass 108 prior to mounting of each of the first glass 104, the second glass 106, and the third glass 108 on the frame 102. In some embodiments, as shown in FIGS. 5A and 5B, an additional sealant layer (not shown) may be provided in gaps 510, 512 between adjacent edges of each of the first glass 104, the second glass 106, and the third glass 108 after aligning of each of the fritting portions 110, 112, 114, respectively.

In some embodiments, additional spacing and/or damping elements (not shown) may be provided between each of the first glass 104, the second glass 106, and the third glass 108, and/or between the frame 102 and each of the first glass 104, the second glass 106, and the third glass 108. In some embodiments, one or more additional steps may be performed in order to bond each of the first glass 104, the second glass 106, and the third glass 108 to the frame 102, such as application of pressure, application of heat, application of curing agent such as ultraviolet (UV) light, and so on. It should be noted that although the method 600 is described herein with reference to the tool 200, in other embodiments, the first glass 104, the second glass 106, and/or the third glass 108 may be assembled on the frame 102 of the cab 100 using the tool 300 described with reference to FIG. 3 in a manner similar to that of the tool 200. It should also be noted that although the tool 200 and the method 600 are described herein with reference to the first glass 104, the second glass 106, and the third glass 108 associated with a front side of the cab 100, in other embodiments, the tool 200 and the method 600 may be employed for assembling one or more glass panels associated with a rear side of the cab 100.

The tool 200, 300 provides a simple, effective, and cost-efficient method for aligning the fritting portion 110, 112, 114 across each of the first glass 104, the second glass 106, and the third glass 108. The tool 200, 300 may be easily rotated about the respective alignment pin during assembling of the respective glass panels, in turn, reducing labor effort, reducing operator skill, reducing process duration, improving alignment, improving accuracy, and improving aesthetics. The tool 200, 300 includes a simple design with no moving components, in turn, improving usability. The tool 200, 300 may be manufactured using known manufacturing processes and readily available materials, in turn, reducing complexity and costs. The tool 200, 300 may be used to align glass panels on any vehicle or structure, in turn, improving flexibility and compatibility.

While aspects of the present disclosure have been particularly shown and described with reference to the embodiments above, it will be understood by those skilled in the art that various additional embodiments may be contemplated by modification of the disclosed machines, systems and methods without departing from the spirit and scope of the disclosure. Such embodiments should be understood to fall within the scope of the present disclosure as determined based upon the claims and any equivalents thereof.

What is claimed is:

1. A spacer tool for assembling a glass panel on a frame, the spacer tool comprising:
 a body defining a central axis and a width along the central axis;
 a bore disposed within the body and axially aligned along the central axis, the bore adapted to receive an alignment pin disposed on the frame; and
 a plurality of lands disposed on the body, each of the plurality of lands disposed substantially parallel to and spaced apart from the central axis, each of the plurality of lands adapted to selectively contact an edge of the glass panel,
 wherein each of the plurality of lands is disposed at a distance relative to the central axis different from one another, the distance of each of the plurality of lands measured in a direction that is perpendicular to a respective land.

2. The spacer tool of claim 1, wherein each of the plurality of lands is substantially perpendicular to one another.

3. The spacer tool of claim 1, wherein opposing lands of the plurality of lands are substantially parallel to one another.

4. The spacer tool of claim 1, wherein the plurality of lands includes four lands.

5. The spacer tool of claim 1, wherein each of the plurality of lands has a substantially rectangular configuration.

6. The spacer tool of claim 1, further comprising a plurality of connecting surfaces, each of the plurality of connecting surfaces disposed between adjacent lands of the plurality of lands.

7. The spacer tool of claim 6, wherein each of the plurality of lands is raised relative to adjacent connecting surfaces of the plurality of connecting surfaces.

8. The spacer tool of claim 6, wherein each of the plurality of connecting surfaces defines an angle relative to an adjacent land of the plurality of lands.

9. The spacer tool of claim 8, wherein the angle of each of the plurality of connecting surfaces is different from one another.

10. The spacer tool of claim 6, wherein each of the plurality of connecting surfaces has a curved configuration.

11. The spacer tool of claim 1, wherein the spacer tool has a substantially diamond-like configuration.

12. The spacer tool of claim 1, wherein the spacer tool has a substantially rectangular configuration.

13. The spacer tool of claim 1, wherein the spacer tool is manufactured using at least one of molding and additive manufacturing.

14. The spacer tool of claim 1, wherein the spacer tool is manufactured using a polymer.

15. A spacer tool for assembling a glass panel on a frame, the spacer tool comprising:
 a body defining a central axis and a width along the central axis;
 a bore disposed within the body and axially aligned along the central axis, the bore adapted to receive an alignment pin disposed on the frame; and
 a plurality of lands disposed on the body, each of the plurality of lands disposed substantially parallel to and spaced apart from the central axis, each of the plurality of lands adapted to selectively contact an edge of the glass panel, wherein each of the plurality of lands is disposed at a distance relative to the central axis different from one another, and the bore extends substantially along the width of the body.

16. A method for assembling a glass panel on a frame using a spacer tool, the method comprising:

providing, rotatably, the spacer tool on an alignment pin disposed on the frame;

providing the glass panel on the frame adjacent to the spacer tool;

contacting an edge of the glass panel with a first land of a plurality of lands disposed on the spacer tool, the first land disposed at a first distance from a central axis of the spacer tool; and aligning a fritting portion on the glass panel with another fritting portion of an adjacent glass panel.

17. The method of claim 16, further comprising rotating, about the alignment pin, the spacer tool to contact the edge of the glass panel with any of a second land, a third land, and a fourth land of the plurality of lands.

18. The method of claim 16, further comprising removing the spacer tool from the alignment pin.

19. The method of claim 16, further comprising bonding the glass panel to the frame.

20. The method of claim 16, wherein providing the spacer tool includes receiving the alignment pin within a bore of the spacer tool.

* * * * *